Patented Oct. 21, 1952

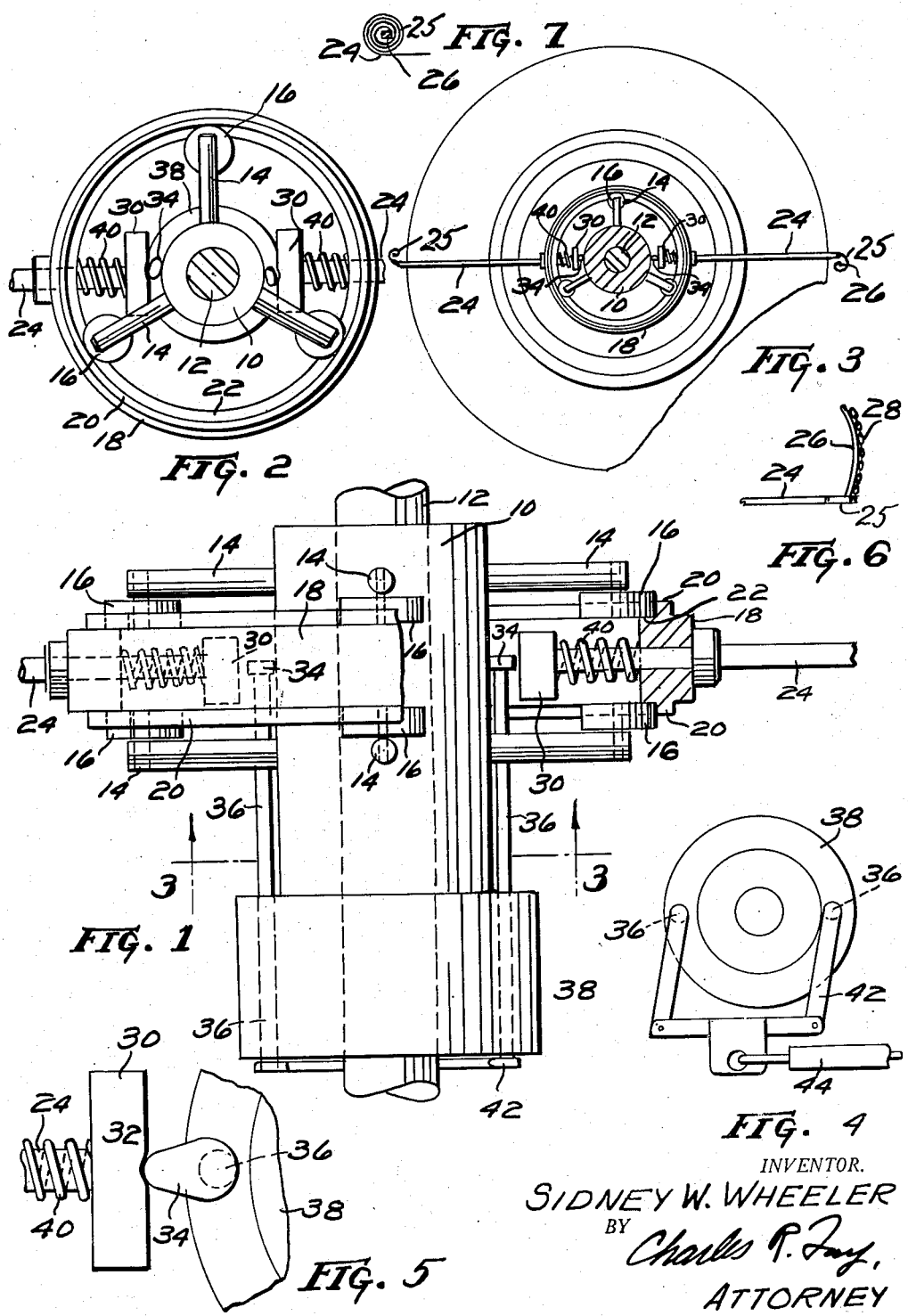

2,614,600

UNITED STATES PATENT OFFICE 2,614,600

WHEEL CARRIED APPLYING AND REMOVING ANTISKID DEVICE

Sidney W. Wheeler, South Berlin, Mass., assignor of one-half to Florence H. Wheeler, South Berlin, Mass.

Application September 14, 1950, Serial No. 184,852

6 Claims. (Cl. 152—216)

This invention relates to a device for quickly and easily applying anti-skid devices to the rim or tread portions of vehicle wheels or tires merely by the simple manipulation of a rod element or the like, whereby said anti-skid devices may be applied from a remote position in the vehicle such as, for instance, from the driver's seat.

One of the principal objects of the present invention resides in the provision of a practical, relatively uncomplicated mechanism including a pair of rods disposed in radial relation with respect to the wheel to which the device is to be applied, each of said rods supporting at the outer ends thereof a transverse or laterally projecting piece supporting an anti-skid chain element thereon, in combination with spring means normally urging said devices to tightly engage the periphery of the wheel or tread of the tire and including cam means operable from a remote position to hold said rods in extended inoperative condition or selectively to enable the springs to accomplish their purpose of applying the anti-skid devices to the wheels or tire.

Other objects and advantages of the invention will appear hereinafter.

Reference is to be had to the accompanying drawings in which

Fig. 1 is a plan view of the device, parts being broken away and part being in section;

Fig. 2 is a view in elevation illustrating the device of Fig. 1 on a reduced scale;

Fig. 3 is a view in elevation of a vehicle wheel illustrating the device applied thereto, part being broken away;

Fig. 4 is a view in elevation illustrating the remote control cam actuating means;

Fig. 5 is an enlarged view illustrating one of the cams;

Fig. 6 is a detailed view showing an anti-skid device; and

Fig. 7 is a detail of a chain device securing means.

The present device is adapted to be supported from the rear axle housing of a vehicle generally indicated at 10, the rear axle being conventionally illustrated at 12. Threaded into or otherwise secured in radial relation on the rear axle housing 12 are a plurality of pairs of short rods 14 which extend outwardly and at their outermost ends carry rotary ball bearings 16 which, as seen in Fig. 1, are, therefore, arranged in spaced pairs about the housing 10. Included between these pairs of bearings is a ring 18 having a circumferential flange 20 at each side thereof forming a pair of circular shoulders 22, which construction results in a circular track so that the ring 18 may rotate at high speed supported and centered on the outer races of the ball bearings, the flanges 20 preventing displacement of the ring 12 in any direction, as will be clear.

Ring 18 radially slidably supports a pair of diametrically opposed rods 24 extending normally beyond the periphery of the wheel or the tire and terminating in coil springs 25 which hold transversely extending ends 26, the latter overlying the tread of the tire and each of which supports thereon a chain element 28 which provides the anti-skid means of the present case.

The inner ends of rods 24 terminate in blocks 30 preferably provided with center indentations 32 for receiving the nose of an eccentric cam 34 of which there are two, one for each block. Each cam 34 is mounted at the end of a rotatable rod 36 extending in a direction to be rotatably supported in a housing 38. Between the inner aspect of ring 18 and blocks 30, each rod carries a compression spring 40 which normally tends to draw the rods 24 radially inwardly to apply the projections 26 tightly to the periphery of the tire at diametrically opposite sides thereof whereby the chains 28 are applied thereto.

In order to rotate the cams to accomplish the function of moving the rods outwardly radially to disengage the same from the tire, there is provided a linkage 42 controlled by a rod 44, which rod may extend to any position desired such as the front or driver's seat of a vehicle. At such point, the rod is controlled by a lever or plunger or some similar device so as to swing the linkage 42 to simultaneously rotate the cams as for instance from the locked position of Figs. 3 and 5 wherein the chain devices are disengaged from the wheel, to the position of Fig. 2 wherein the rods 24 have been brought inwardly to engage the anti-skid devices with the tire as above described.

It will be seen that when the chain devices are tightly applied to the tire as above described, the rods 24 being thus detachably secured thereto, cause the ring 18 to rotate, as supported on the bearings 16, with the rotation of the tire or wheel. It is contemplated that the present device will be used only as an emergency measure, but, of course, is extremely quickly and easily operated to either engage or disengage the anti-skid devices whenever needed.

In the operation of the device, the rings 18 may or may not rotate on the bearings 16 by reason of engagement therewith in the circular tracks caused by flanges 20. These bearings center the rings about the axle and clearly prevent disengagement of the ring. When the device is at rest, the cams 34 are bearing on elements 30 (see Fig. 5) and pressure being transmitted by means of springs 40 to the ring, keeps the ring stationary. When it is desired to apply the anti-skid devices, the rod 44 is actuated to cause levers 42 to swing cams 34 away from blocks 30 so that the springs 40 urge rods 24 radially inwardly, thus applying anti-friction devices 26 to the periphery of the tire. The anti-friction devices are thereby clamped thereto and obviously this will cause rods 24 to rotate with the wheel as well as ring 18, until such time as the rod 44 is actuated in the opposite direction to swing cams 34 back to the Fig. 5 position, so that the blocks 30 are gradually stopped and held thereby in outwardly moved position to release the anti-friction devices 26 from the tire, whereupon the ring will stop due to cams 34 stopping blocks 30.

This invention provides a very simple anti-skid applying means which may be instantly applied whenever desired and just as instantly disengaged when the need for the emergency device is no longer present. The mechanism is so simple as to take up but little space and it can fit behind the wheels of modern cars, as the cumbersome and complicated prior art devices cannot.

The springs 25 impart sufficient give to the device to provide for gripping the tire by the ends 26 in spite of variations in the tire treads, etc.

Having thus described my invention and the advantages thereof, I do not wish to be limited to the details herein disclosed otherwise than as set forth in the claims, but what I claim is:

1. A device of the class described comprising a support, radial elements extending therefrom, anti-friction devices on said radial elements, a ring rotatably mounted about said support on said anti-friction devices, means to center said ring relative to said support, rods radially mounted and slidable in the ring, spring means to retract the rods radially inwardly in the direction toward the support, cam means to extend the rods in the opposite direction, means at the outer ends of said rods for gripping the tread of the tire or the like, anti-skid devices on said last named means, and remote controlled means for rotating said cams.

2. A device of the class described comprising a support, a ring rotatably mounted thereabout, means to normally prevent rotation of the ring, and means selectively engageable with a tire or the like to cause the ring to rotate therewith, said second named means comprising a plurality of radial arranged rods slidably mounted on the ring, transverse means at the outer ends thereof to engage the tire, an eccentric type cam at the inner end of each rod, means to turn the cams to force the rods radially outwardly, means normally retracting the rods radially inwardly, and chain type anti-skid devices on each rod on said transverse means.

3. The device of claim 2 including ball bearings rotatably supporting the ring in pairs, and a track on the ring engaging the ball bearings for guided rotation of the ring thereon.

4. The device of claim 2 including a lever for each cam, a link connecting the levers, and a rod for operating the link to rotate the cams simultaneously from a remote position.

5. A device of the class described comprising a housing for a vehicle axle, a series of spaced pairs of radial studs thereon, a bearing on each stud, a ring rotatably supported by the bearings, a track on the ring receiving the bearings for centering the ring on the housing, a pair of diametrically opposed slidably and radially mounted rods on the ring, a block on each rod at its inner end, a tire engaging portion at the outer end of each rod, an eccentric for each block, the eccentrics being stationarily pivoted in position to engage the blocks to move the rods radially outwardly, springs to move the rods radially inwardly to apply the tire engaging portions to the tire, and a remote control linkage to operate the eccentrics simultaneously.

6. A device of the class described comprising a support, a ring rotatably mounted thereabout, means to normally prevent rotation of the ring, and means selectively engageable with a tire or the like to cause the ring to rotate therewith, said second named means comprising a plurality of radial arranged rods slidably mounted on the ring, transverse means at the outer ends thereof to engage the tire, an eccentric type cam at the inner end of each rod, means to turn the cams to force the rods radially outwardly, means normally retracting the rods radially inwardly, chain type anti-skid devices on each rod on said transverse means, and spring devices mounting the said transverse means on the rods.

SIDNEY W. WHEELER.

REFERENCES CITED

The following references are of record in the file of this patent:

UNITED STATES PATENTS

| Number | Name | Date |
|---|---|---|
| 2,195,982 | Daley | Apr. 2, 1940 |
| 2,195,983 | Daley | Apr. 2, 1940 |